March 8, 1960 F. T. MAY 2,927,365
LEAD WIRE THREADING MACHINE
Filed May 17, 1954 10 Sheets-Sheet 1
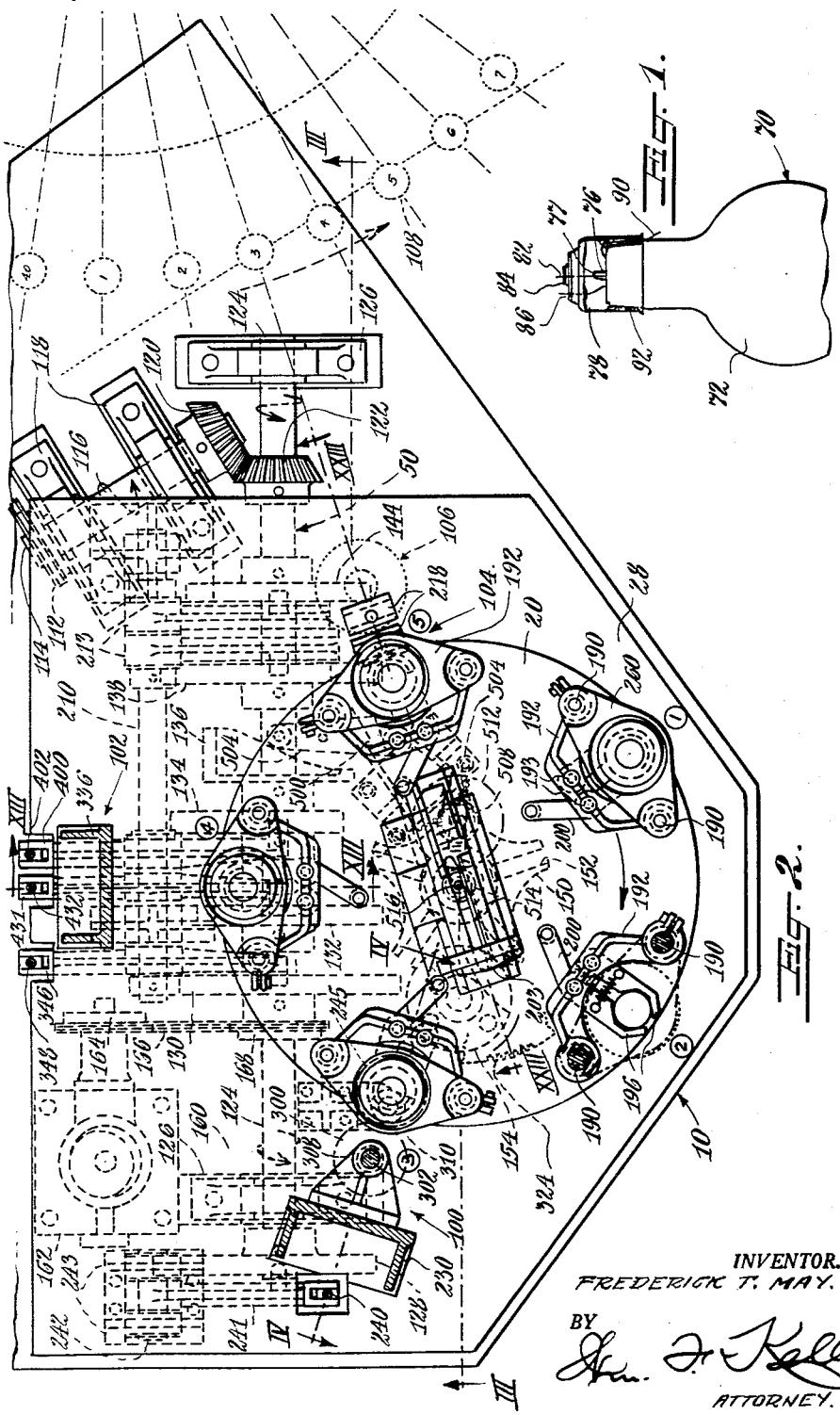
INVENTOR.
FREDERICK T. MAY.
BY
ATTORNEY.

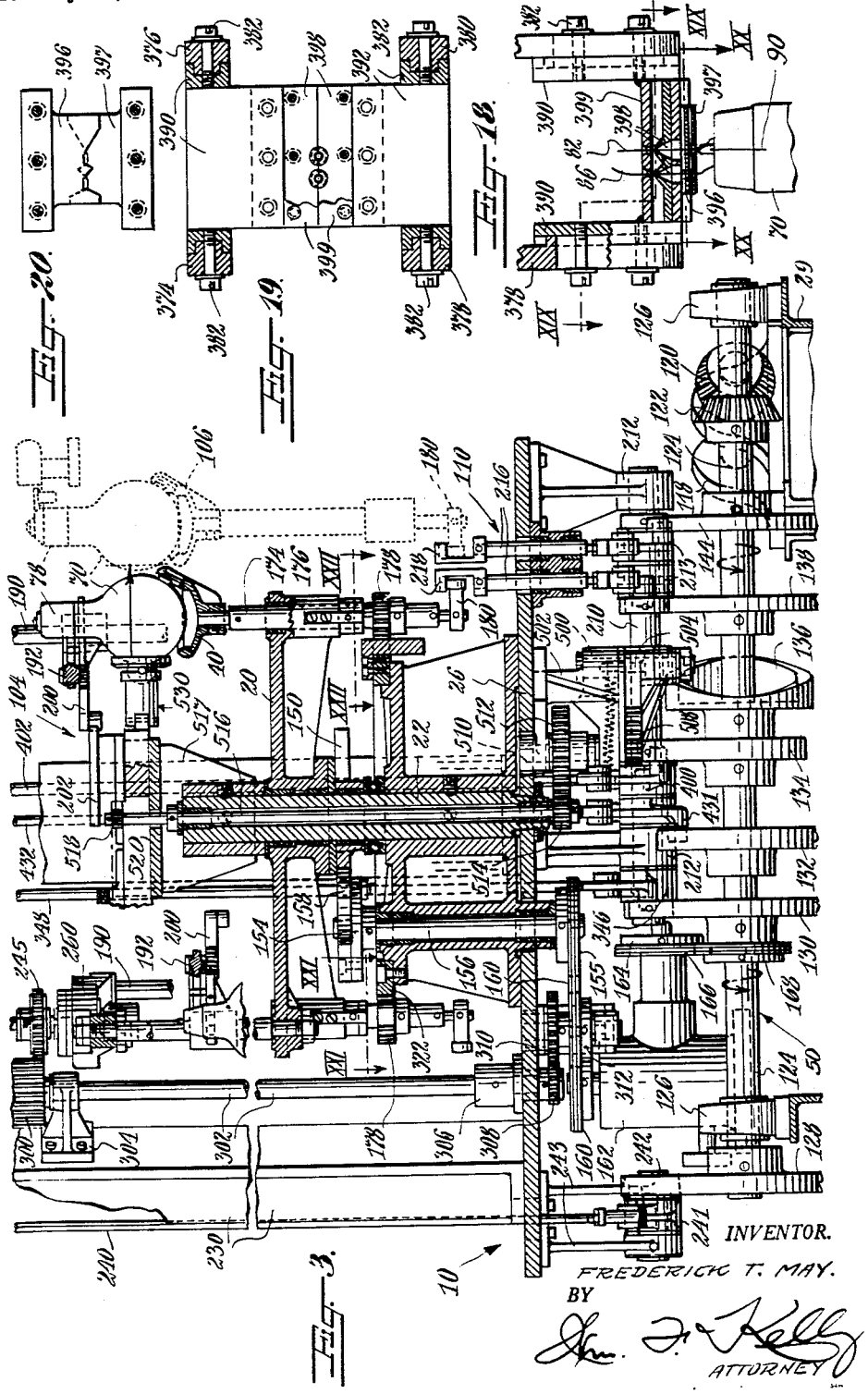

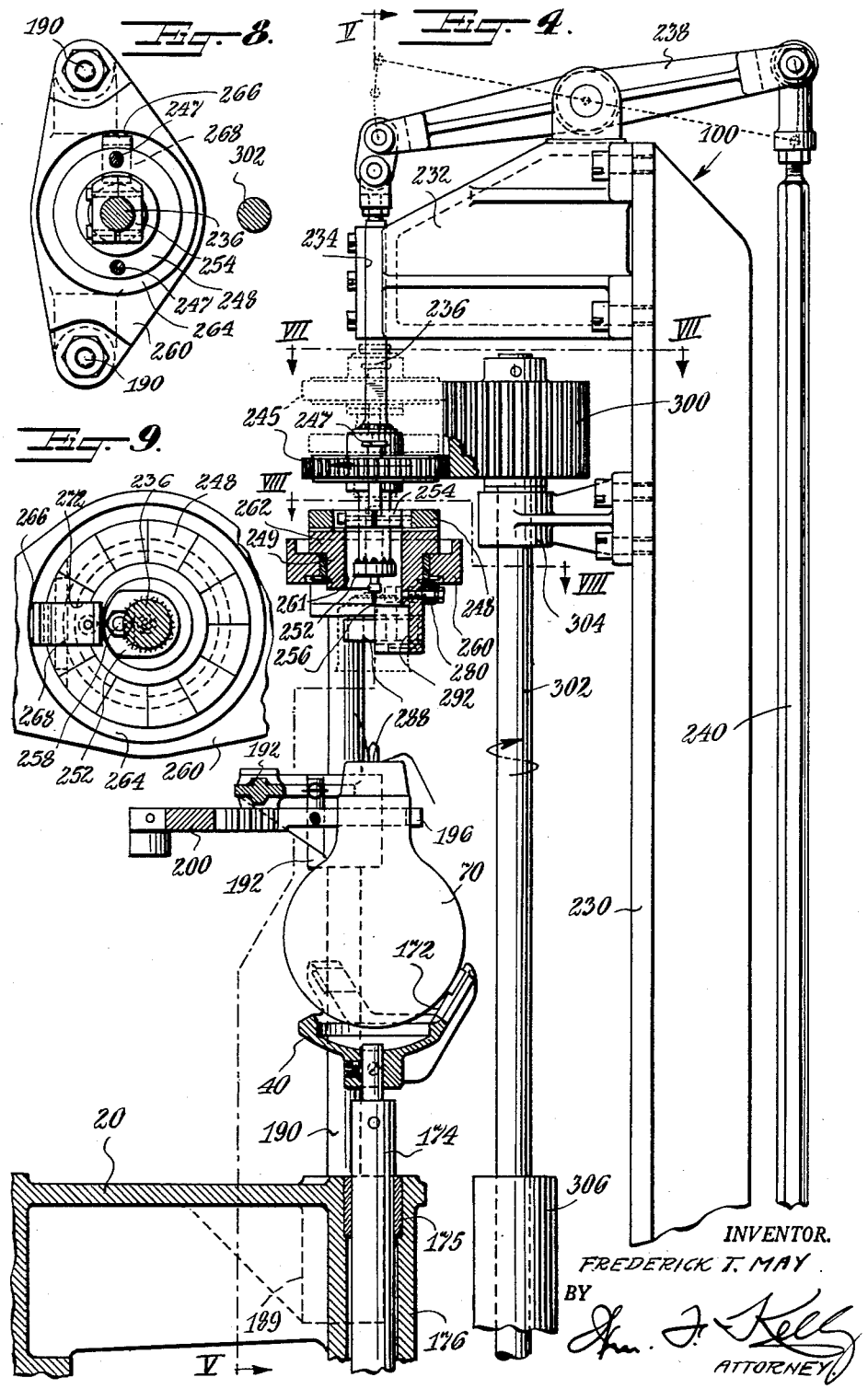

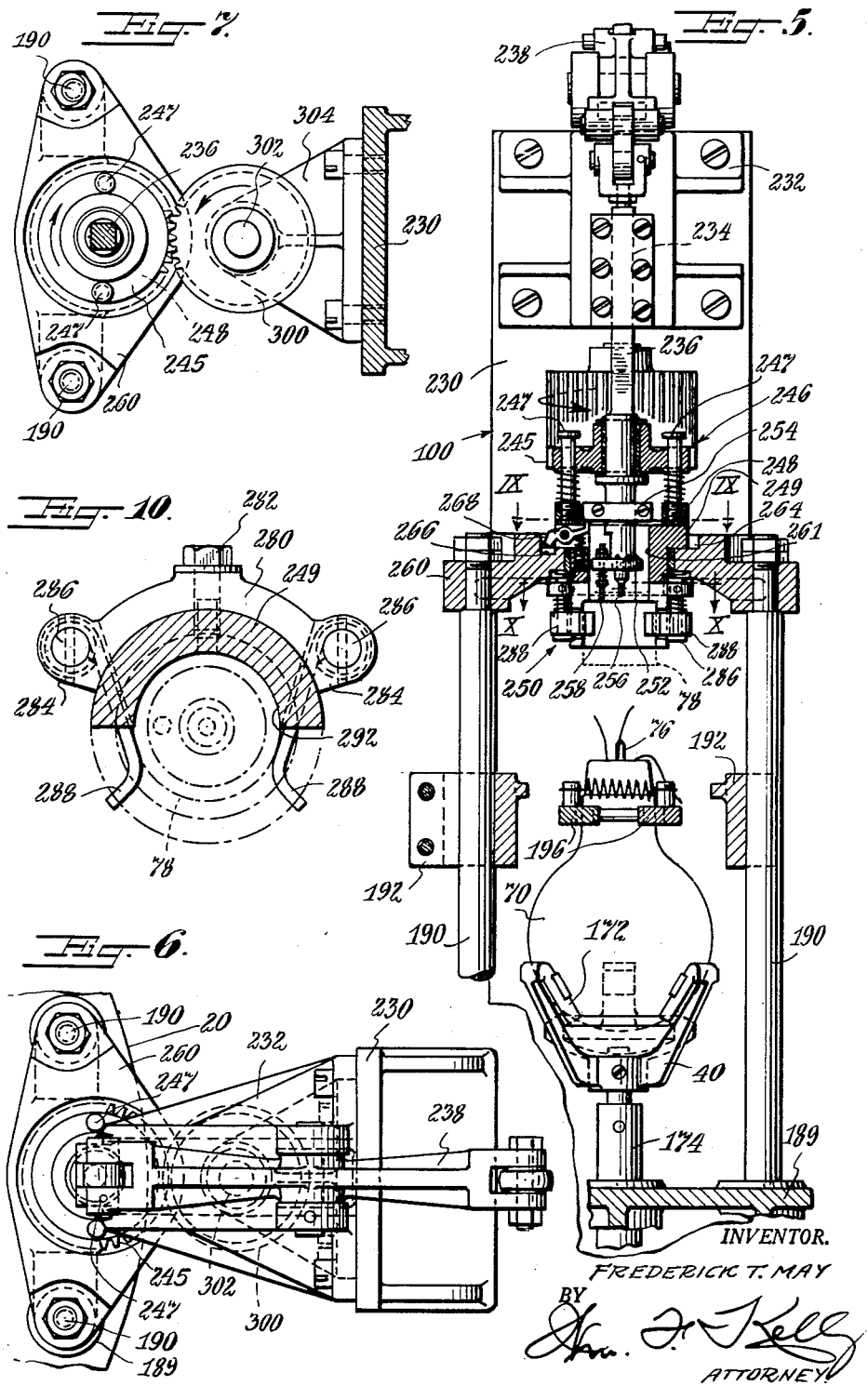

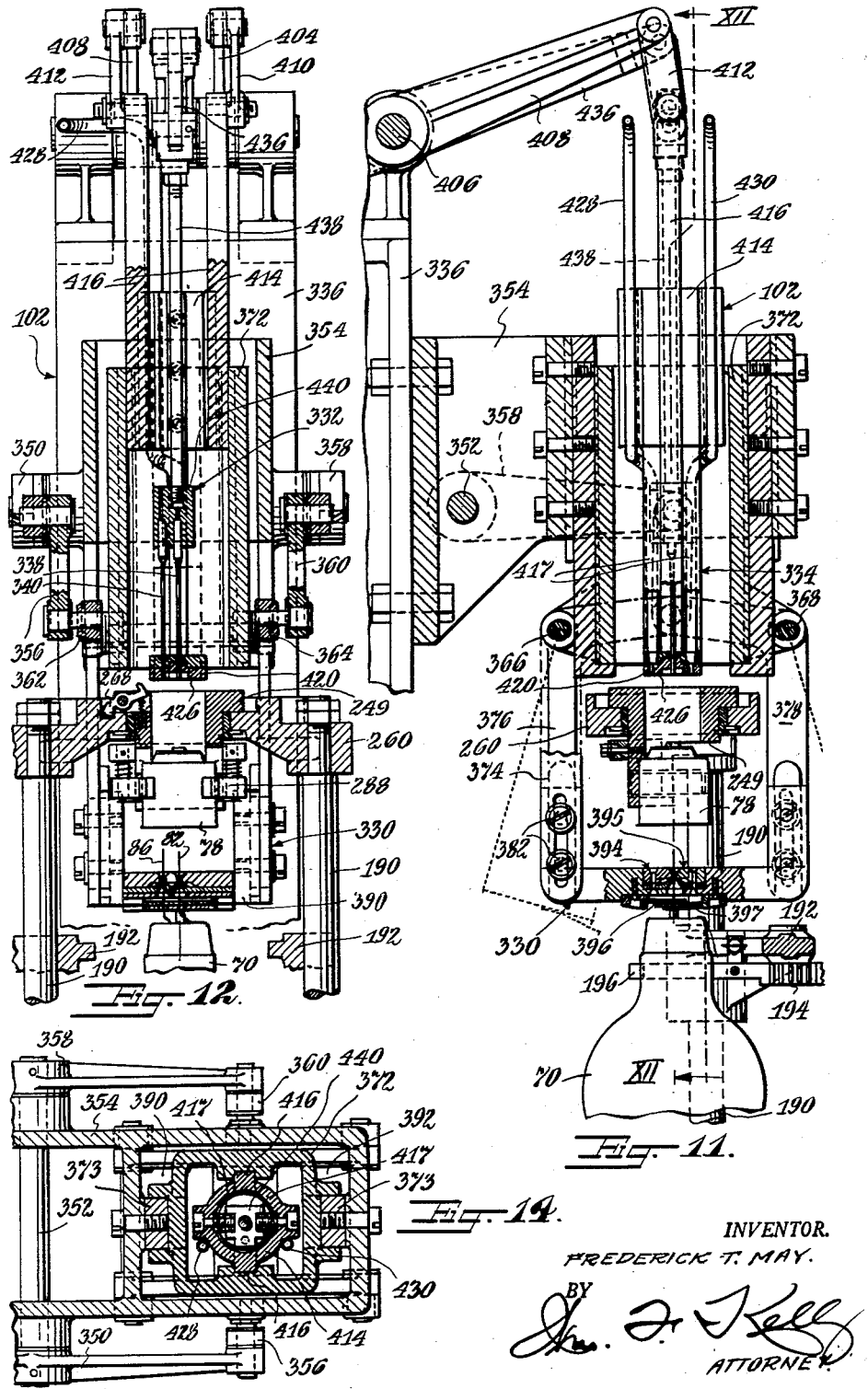

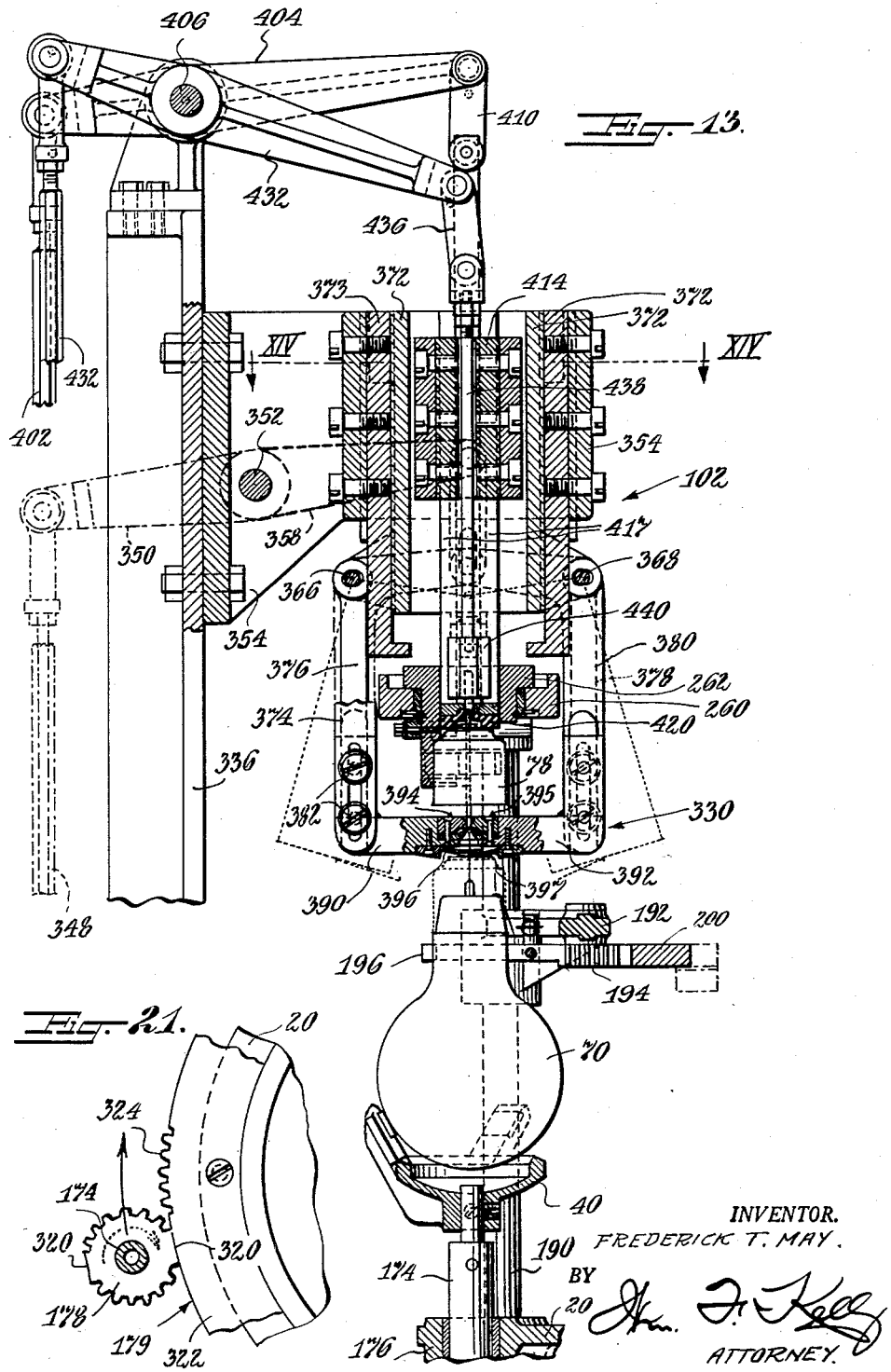

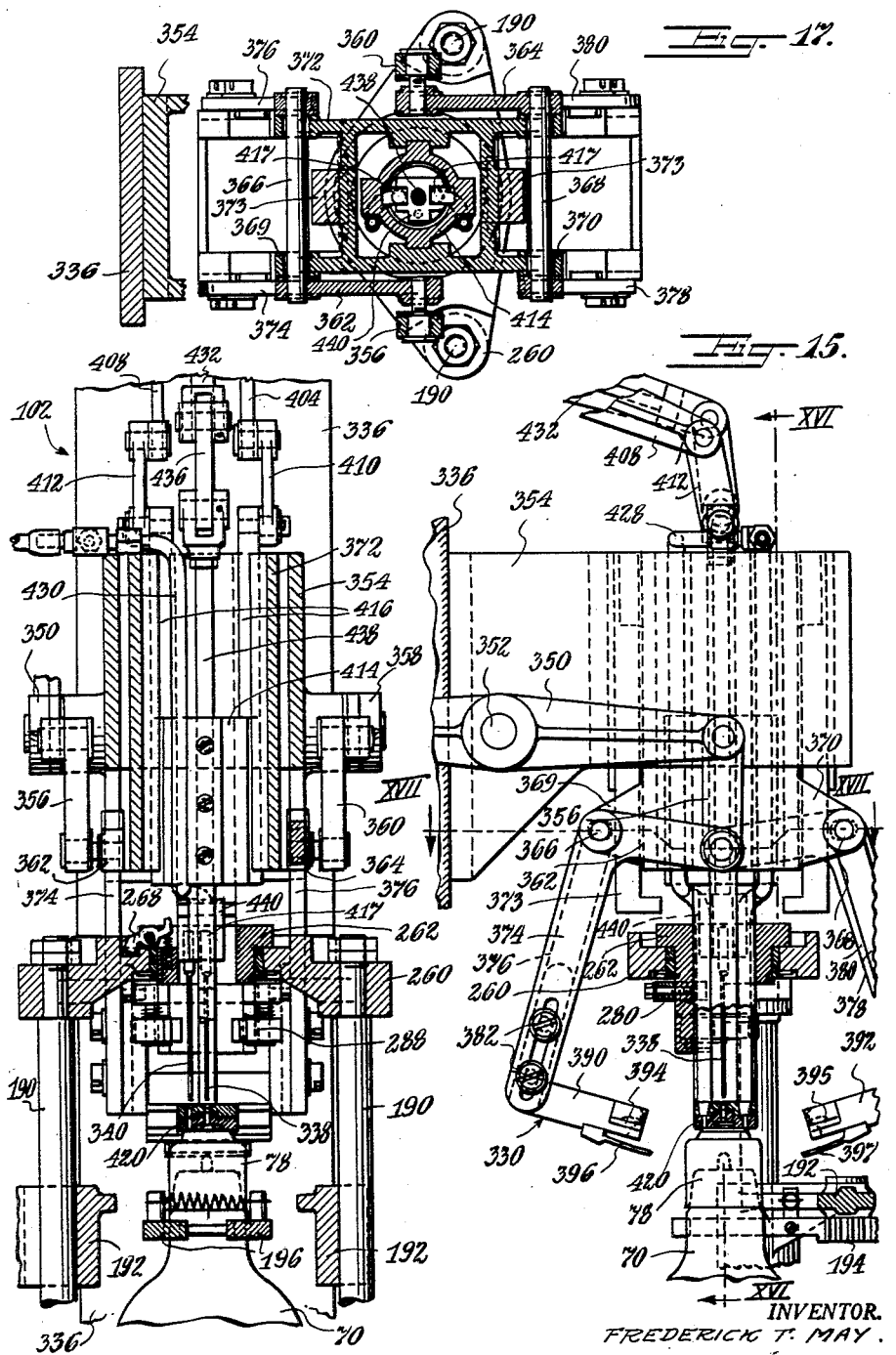

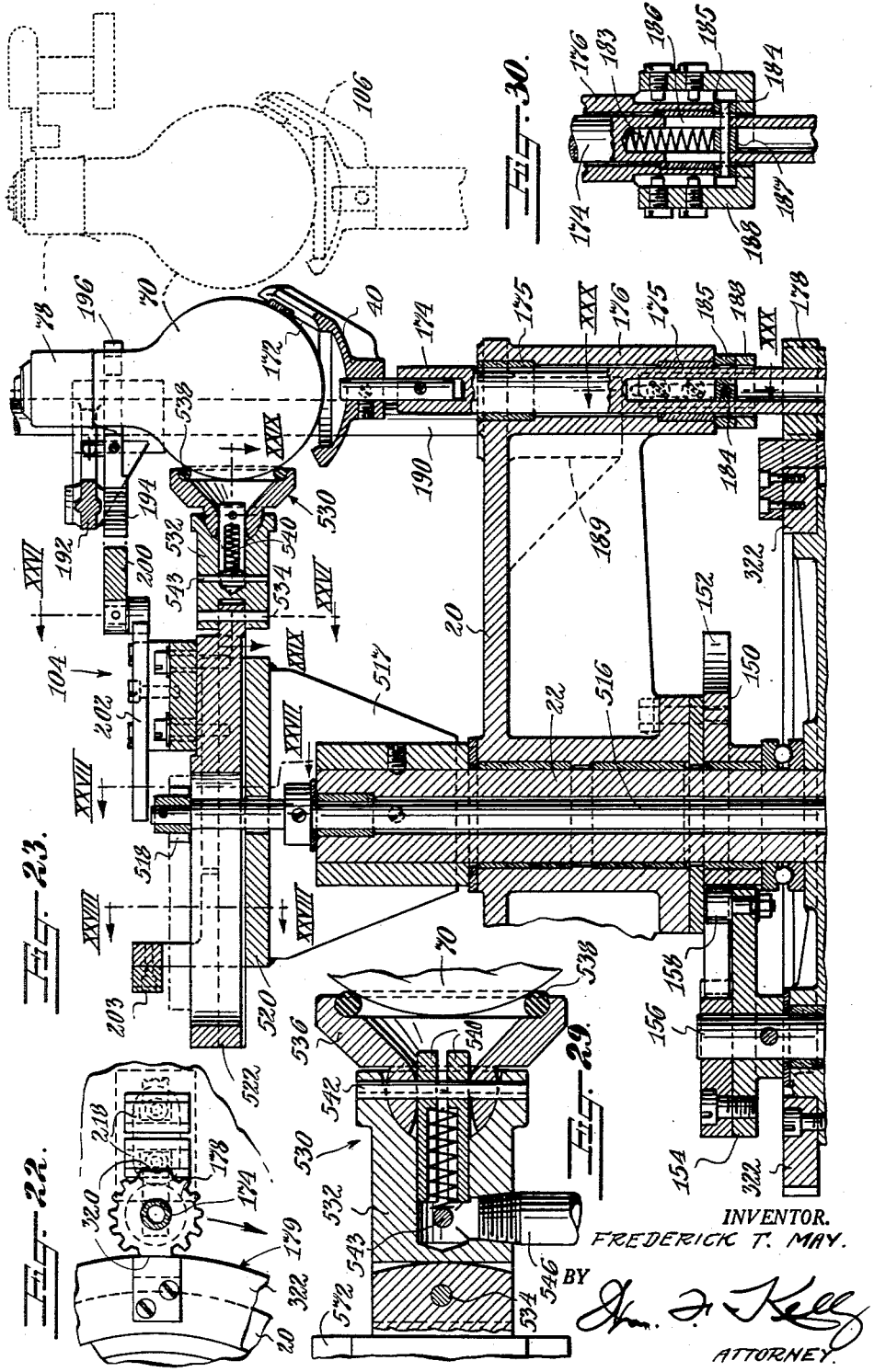

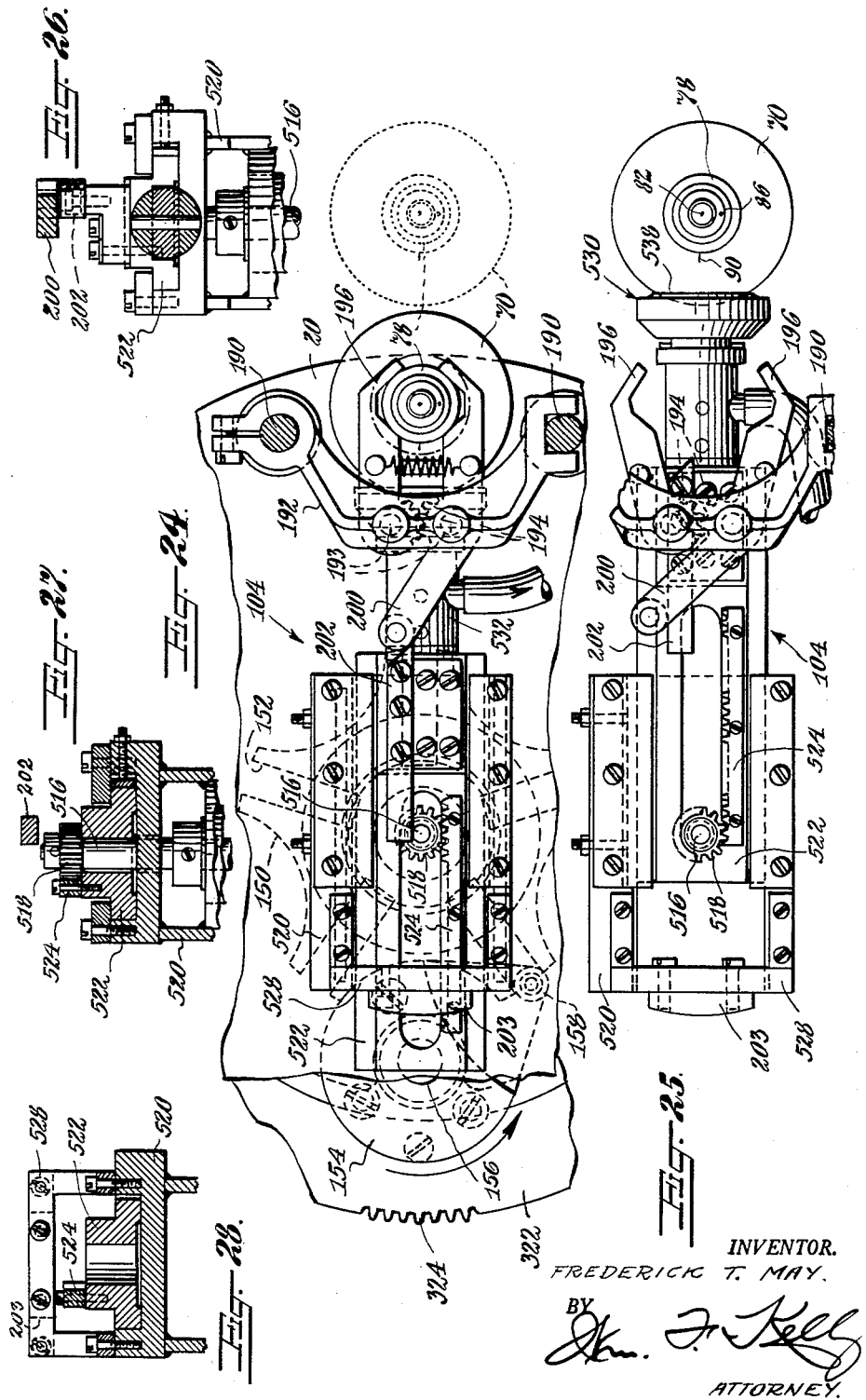

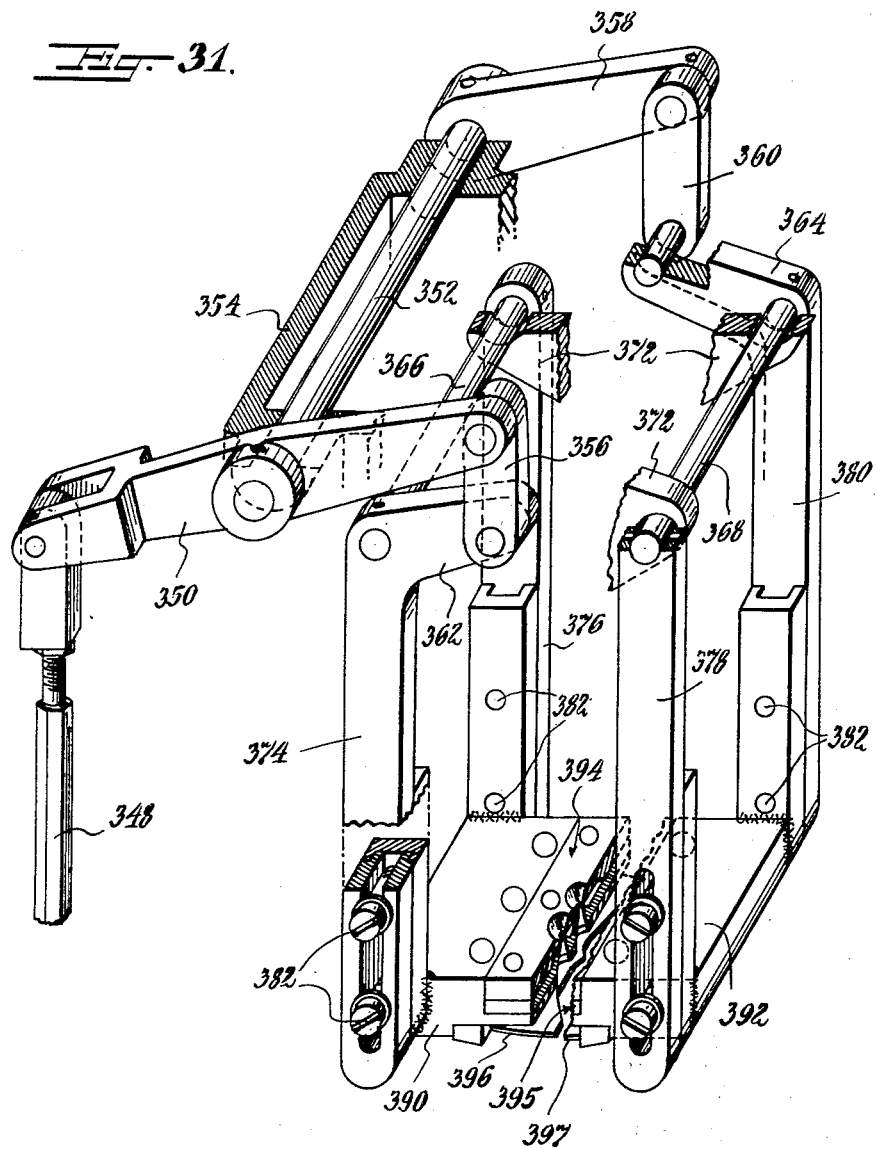

United States Patent Office 2,927,365
Patented Mar. 8, 1960

2,927,365

LEAD WIRE THREADING MACHINE

Frederick T. May, Verona, N.J., assignor to Westinghouse Electric Corporation, East Pittsburgh, Pa., a corporation of Pennsylvania Application May 17, 1954, Serial No. 430,240

4 Claims. (Cl. 29—25.19)

The present invention relates to the manufacture of incandescent lamps and, more particularly, to an incandescent lamp lead wire threading machine.

Incandescent lamps having a major and minor filament in series, which are capable of individual operation or series operation, are known in the art as "3-way light" incandescent lamps. The base employed for the "3-way light" incandescent lamp comprises a shell electrically insulated from a ring which in turn is, also electrically insulated from an eyelet. The lamp mount has three leading-in and supporting conductors or lead wires, one of which is connected to one leg of the minor filament. A second is connected to one leg of the major filament and the third leading-in or common conductor is joined to the other legs of the major and minor filaments. During the threading operation prior to the basing of the lamp, the minor filament lead wire is threaded through a hole in the base ring, the major filament lead-wire conductor is threaded through the eyelet, and the common lead wire is juxtaposed over the upper lip of the base shell. In the past two operators have been employed to position and thread the lead wires of the "3-way light" incandescent lamp into the base.

Hence, it has been found advantageous according to the invention to provide a semi-automatic lead wire threading machine which, when synchronized with a basing machine, threads and positions the lead wires into the base and places the threaded lamp and base in a basing head of a finishing or basing machine. The machine of the invention has a rotatable turret for carrying a plurality of heads, for example 5, and indexable through a like number of work stations. The threading machine is provided with a base positioning mechanism at station "3," a lead wire threading mechanism at station "4" and an automatic lamp transfer device and threading and basing machine head pull-down device at station "5."

Although at present the lead wire threader of the invention is semi-automatic due to the fact that the operator loads the lamp and base into the machine by hand it is possible to provide an automatic base loader and an automatic bulb transfer device on an adjacent sealex machine, thus making the lead wire threading machine fully automatic.

In its general aspect the present invention has as its objective an automatic lead wire threading machine which is synchronized with an automatic lamp basing machine.

Other objects of the present invention will become apparent to those skilled in the art to which it appertains as the description thereof proceeds, both by direct recitation and by implication of the context.

Referring now to the drawings in which like numerals of references indicate similar parts throughout the several views:

Fig. 1 is a fragmentary side elevational view of an exhausted incandescent lamp and a base showing a threaded lamp produced by the lead wire threading machine of the invention.

Fig. 2 is a plan elevational view of the lead wire threading machine showing its drive mechanism and a portion of a synchronized multiple head incandescent lamp finishing or basing machine which utilizes the threaded lamp produced by the lead wire threading machine.

Fig. 3 is a vertical sectional view of the lead wire threading machine along the line III—III of Fig. 2 in the direction of the arrows.

Fig. 4 is a vertical sectional view of a base positioning mechanism at station "3" of the threading machine along the line IV—IV of Fig. 2 in the direction of the arrows, but shown on a larger scale.

Fig. 5 is a vertical sectional view of the base positioning mechanism of Fig. 4 along the line V—V of Fig. 4 in the direction of the arrows.

Fig. 6 is a plan view of the base positioning mechanism of Fig. 4.

Fig. 7 is a horizontal sectional view of the base positioning mechanism along the line VII—VII of Fig. 4 in the direction of the arrows.

Fig. 8 is a view similar to Fig. 7 along the line VIII—VIII of Fig. 4 in the direction of the arrows.

Fig. 9 is a view similar to Figs. 7 and 8 along the line IX—IX of Fig. 5 in the direction of the arrows but on a larger scale.

Fig. 10 is a view similar to Figs. 7, 8 and 9 along the line X—X of Fig. 5 in the direction of the arrows but on a still further enlarged scale.

Fig. 11 is a vertical sectional view of a lead wire threading mechanism at station "4" along the line XI—XI of Fig. 2 in the direction of the arrows (on the same scale as Fig. 4), showing lead wire stretching and positioning jaws in their lowermost closed position and hollow lead wire receiving needles and base delivery plunger in their uppermost position.

Fig. 12 is a vertical sectional view of the lead wire threading mechanism of Fig. 11 along the line XII—XII of Fig. 11 in the direction of the arrows.

Fig. 13 is a vertical sectional view similar to Fig. 11 of the lead wire threading mechanism along the line XIII—XIII of Fig. 2, in the direction of the arrows, showing the lead wire threading mechanism in the operating position with the lead wire jaws in the closed uppermost position and ready to open, the hollow needles at the end of their down stroke position and having the upper end of the lead wires thereinside and the base delivery plunger in contact with the base partway through the down stroke.

Fig. 14 is a horizontal sectional view of the lead wire threading mechanism along the line XIV—XIV in Fig. 13 in the direction of the arrows.

Fig. 15 is a side elevational view partially in section (similar to Figs. 11 and 13) of the lead wire threading mechanism, showing the lead wire jaws in their open position, the hollow needles still in their lowermost position and the base delivery plunger at the end of its down stroke having delivered the base over the end of the bulb.

Fig. 16 is a vertical sectional view of the lead wire threading mechanism along the line XVI—XVI of Fig. 15 in the direction of the arrows.

Fig. 17 is a horizontal cross-sectional view of the lead wire threading mechanism along the line XVII—XVII of Fig. 15 in the direction of the arrows.

Fig. 18 is a vertical sectional view of the lead wire stretching and positioning jaws of the lead wire threading mechanism in their closed lowermost position which is similar to the position of the jaws shown in Fig. 12.

Fig. 19 is a horizontal sectional view of the lead wire stretching and positioning jaws along the line XIX—XIX of Fig. 18 in the direction of the arrows.

Fig. 20 is a horizontal sectional view similar to Fig. 18 along the line XX—XX in the direction of the arrows.

Fig. 21 is a horizontal sectional view of the bulb holder rotating mechanism between station "2" and station "3" along the line XXI—XXI of Fig. 3 but on a larger scale.

Fig. 22 is another horizontal sectional view of the bulb holder hotating mechanism at station "5" along the line XXII—XXII of Fig. 3 but on a larger scale.

Fig. 23 is a vertical sectional view of the lamp transfer mechanism at station "5" along the line XXIII—XXIII of Fig. 2 in the direction of the arrows, showing the transfer mechanism in its normal non-transfer position, but on a larger scale than Fig. 2.

Fig. 24 is a top elevational view of the lamp transfer mechanism of Fig. 23 showing the mechanism in its normal non-transfer position.

Fig. 25 is a top elevational view similar to Fig. 24 but showing the lamp transfer mechanism in its transfer position.

Fig. 26 is a vertical cross-sectional view of the lamp transfer mechanism along the lines XXVI—XXVI of Fig. 23 in the direction of the arrows.

Fig. 27 is a vertical cross-sectional view of the lamp transfer mechanism along the line XXVII—XXVII of Fig. 23 is the direction of the arrows.

Fig. 28 is a view similar to Fig. 27 along the line XXVIII—XXVIII of Fig. 23 in the direction of the arrows.

Fig. 29 is a fragmentary horizontal sectional view of the lamp transfer mechanism along the line XXIX—XXIX of Fig. 3, but shown on a larger scale.

Fig. 30 is a vertical sectional view of a portion of one of the base holder spindles of the threading machine along the line XXX—XXX of Fig. 23 in the direction of the arrows.

Fig. 31 is a perspective view of the lead wire stretching and positioning jaw mechanism of the lead wire threading mechanism of the lead wire threading machine of the invention.

Referring now to the drawings, and particularly to Figs. 2 and 3, the reference numeral 10 designates a lead wire threading machine of the invention.

The machine 10 has a rotatable turret 20 (Figs. 2, 3, 23 and 24) for carrying a plurality of lamp holder heads 40, for example 5 in the present showing of Fig. 1, which are indexable through a like number of stations by a drive mechanism 50.

The turret 20 is rotatable on suitable bearings in a hollow support shaft 22 (Fig. 3), upstanding in a turret mounting casting from a table 26 of a frame 28 of the machine 10. In addition to the table 26, the frame 28 has a drive mechanism mounting platform 29 (Fig. 3) which may be suitably integrated with the table 26 by upstanding columns or posts (not shown).

Referring particularly to Fig. 1 an incandescent lamp 70 has an envelope 72 sealed by the neck portion to a filament mount (not shown). This lamp 70 has been sealed and exhausted, as for example on a conventional sealex machine, and has its exhaust tube 76 tipped-off, as at 77, prior to transfer to the lead wire threading machine 10 of the invention. A base 78 prefilled with a suitable cement has been positioned about the sealed portion of the lamp 70 so that the outer portion of a major filament lead wire 82 is threaded through the eyelet 84 of the base 78. A minor filament lead wire 86 has been threaded through a suitable hole in the base ring 88 and a common lead wire 90 is juxtaposed over the open end of the base shell 92.

At station "1" or station "2" (Fig. 2) a lamp 70 may be loaded manually into a head 40 on the turret 20. At station "3" a base 78 is loaded into a base positioning mechanism 100 (Figs. 4 through 10) and is positioned thereby with respect to the lead wires 82 and 86 of the lamp 70. At station "4" the major filament lead wire 82 and the minor filament lead wire 86 are threaded respectively through the eyelet 84 and the ring 88 of the base 78, automatically by a lead wire threading mechanism 102 (Figs. 11 through 20). At station "5" the lamp 70, properly threaded to the base 78, is transferred automatically by a lamp transfer device 104 (Figs. 23 through 30 and of the type disclosed in U.S. Patent No. 2,823,809, issued February 18, 1958 to the inventor of the subject application) from the head 40 of the machine 10 to a basing machine head 106 (Fig. 2) of the basing machine 108. The heads 40 and 106 have been opened by a head pull-down mechanism 110 (Fig. 3) of the machine 10 at station "5."

Drive mechanism

The drive mechanism 50 (Figs. 2 and 30) may be driven from a main cam drive shaft (not shown) of the adjacent basing machine 108 by means of an intermediate idler shaft (not shown) of the basing machine 108 which is connected by means of a sprocket chain 112 to a sprocket 114 on a gear shaft 116 of the lead wire threading machine 10. This gear shaft 116 is suitably journaled in a pair of upstanding bearings 118 mounted on the floor or the bottom mounting platform 29 of the machine 10, and carries a spiral drive gear 120 which meshes with a driven gear 122 on a main cam and indexing mechanism drive shaft 124 of the lead wire threading machine 10.

The main cam shaft 124 of the lead wire threading machine 10 is suitably journaled in a plurality of, for example two (in the present showing of Fig. 2) bearings 126 upstanding from the bottom mounting platform 29 of the lead wire threading machine 10. This main cam shaft 124 carries thereon a base positioning mechanism operating cam 128 near its left hand end and between the bearings 126 (from left to right when viewed in Figs. 2 and 3) a lead wire stretching and positioning jaw cam 130, a lead wire receiving needle cam 132, a base delivery plunger cam 134, a transfer mechanism barrel cam 136, a threading machine lamp head pull-down cam 138 and a basing machine head pull-down cam 144.

Indexing mechanism

Above the table 26 the lower end of the turret support shaft 22, carries a Geneva driven gear or maltese cross follower 150 (Figs. 2, 3 and 23) provided with a plurality of, for example five (in the present showing of Fig. 2) radial follower slots 152 equally spaced about the periphery of the follower 150 and extending inwardly from the periphery toward the center of the follower 150. The periphery of the Geneva follower 150 which connects the follower slots 152 is suitably concaved inwardly and of generally semi-cylindrical configuration. A rotatable Geneva drive gear or driver 154 is fixed to the upper end of a Geneva drive shaft 156 upstanding (through the table 26) from the bottom mounting platform 29 of the frame 28 of the machine 10. This driver 154 carries an outwardly extending lug for mounting thereon a drive roller 158 engageable in the follower slots 152 for indexing (through rotation of the driver 154) the turret 20.

A Geneva drive sprocket 155 (Fig. 3) on the shaft 156 below the table 26 is connected by a suitable sprocket chain 160 to a right angle drive 162. The right angle drive 162 is driven by means of a sprocket 164, Fig. 2 (carried on its drive shaft) through a sprocket chain 166 by a sprocket 168 on the main cam shaft 124 of the lead wire threading machine 10.

Lamp holder head

Each of the bulb holders 40 (Figs. 2, 3, 4, 5, 23 and 30) has a bulb holder nest 172 contoured to fit the dome of an envelope 72 of a lamp 70, and is carried on the upper end of a bulb holder shaft or spindle 174. This shaft 174 (Fig. 3) is reciprocable and rotatable in suitable bushings 175 in a hub 176 of the turret 20. The lower portions of the shaft 174 which extends below the hub 176 carry, in order, a bulb holder rotating gear 178 of a bulb holder rotating mechanism 179, Figs. 3, 21 and 22 (hereinafter to be described) and a pull down arm 180 on the lower extremity thereof for engagement with the pull down mechanism 110 of the threading machine 10 and the basing machine 108 as hereinafter explained.

Referring particularly to Figs. 23 and 30, the spindle 174 is provided with a vertical axial hole adjacent the lower portions of the hub 176 for retention therein of a recovery spring 183. A pin 184 extends through a retaining ring 185, a vertical pin clearance slot 186 in the spindle 176, a recovery spring retaining insert 187 and thence through the slot 186 and the ring 185. A generally U-shaped ring retaining bracket 188, secured by bolts to the hub 176 retains the ring 185 against the bottom of the hub 176. It will be understood that the ring 185, and insert 187 rotate with the spindle 176 but do not reciprocate therewith.

The turret 20 is provided with mount rod hubs 189 (Figs. 3, 4, 5, 23 and 24). Each of the hubs 189 carries an upstanding mount rod 190. As shown in section in Fig. 5, a bulb holding jaw mounting plate 192 is secured to the mount rods 190. This plate 192 (Figs. 2, 3, 4, 24 and 25) carries a pair of upstanding bulb holding jaw operating shafts 193 (Fig. 2) on which are mounted a pair of meshing gears 194, and a pair of spring biased bulb holding jaws 196 (Fig. 5).

An operating lever 200 (Figs. 2 and 24) carried on the lower portions of the driver shaft 193 carries a suitable roller for engagement with a reciprocating cam 202 carried on the bulb transfer mechanism 104 at station "5," the transfer station of the machine 10, or for hand operation to facilitate the loading of a lamp 70 into a head 40. Between stations 2 and 3 (Figs. 2 and 24) the roller on the operating lever 200 engages a stationary cam 203 mounted, as hereinafter explained on the lamp transfer mechanism 104 to open the jaws 196 when the lamp 70 is rotated 180° by the lamp holding head rotating mechanism 179. It will be understood that as the roller on the operating lever 200 engages the stationary cam 202 (Figs. 23 and 24) that the driver gear 194 is rotated clockwise and the driven gear 194 is rotated counterclockwise (from the plan view of the jaws), thus opening the jaws 196 to permit the transfer or removal of a lamp 70 from a head 40 by the transfer mechanism 104.

At stations "1" or "2," the lamp loading stations, an operator merely inserts the dome of the envelope 72 of an inverted lamp 70 into the bulb nest 172 with the axis of the lamp 70 inclined obliquely from the vertical. The operator then pushes the neck of the bulb 72 between the spring biased bulb holder jaws 196, thus seating the lamp 70 axially within a bulb holder 40.

It will be understood from the showing of Figs. 2 and 3, that the head 106 of the basing or finishing machine 108 is similar in construction to the lamp holding head 40 of the lead wire threading machine 10 and is reciprocable vertically, as is the head 40, by the head pull down mechanism 110.

*Head pull-down mechanism*

The mechanism 110 (Fig. 3) for a head 40 of the threading machine and a head 106 of the basing machine 108 may be considered as part of the lamp transfer mechanism 104, hereinafter to be described. It has a horizontal lever shaft 210 journaled in a pair of brackets 212 which depend from the table 26 of the machine 10. A pair of cam levers 213 (Fig. 2) rotatable on the shaft 210, each carry a cam roller on its free end for engagement respectively, with the threading machine lamp head push-down cam 138 and the basing machine head pull-down cam 144. The other end of each lever 213 is connected to a vertical reciprocable connecting rod 216 extending through a suitable bearing in the table 26. Each connecting rod 216 carries a yoke 218 which is engageable with the horizontal pull-down arm 180 on the bulb holder spindle 174.

*Operation*

At station "5," the transfer station, the cams 138 and 144 move the levers 213 upwardly at a predetermined time. Hence, the connecting rods 216 and the heads 40 and 108 move downwardly therewithin and permit the horizontal transfer of the threaded lamp 70 from the head 40 to a position axially aligned with a head 106 of the basing machine 108. The recovery springs within the spindles 174 return the nests 172 of the heads 40 and 106 to their normal "up" position during the next index of the machines 10 and 108, when either the pull-down arms 180 slide off the yokes 218 or the pull-down cams 138 and 144 return the nests 172 to their "up" position through reversal of the above described linkage.

During the index from station "2" to station "3" the bulb holder head rotating mechanism 179 turns the bulb holder 40 and lamp 70 held therein 180°. A base holder head 250, integrated with the turret 20 as hereinafter explained, and the base 78 do not rotate with the head 40.

*Bulb holder head rotating mechanism*

The bulb holder rotating gear 178 of the bulb holder rotating mechanism 179 (Figs. 21 and 22) fixed on a spindle 174 of a bulb holder head 40 as hereinbefore described (Fig. 3) has two diametrically opposed gearless segments or shoes 320 which normally ride against the toothless portions of a turret ring 322 secured to the periphery of the turret 20, as by bolts. The remainder of the periphery of the gear 178 is provided with teeth which are meshable with a gear segment 324 (Figs. 21 and 24) provided in the periphery of the ring 322 between station "2," the lamp loading station, and station "3," the base loading and positioning station (Fig. 24). At station "5" (Figs. 3 and 23) the ring 322 has a depending extension to permit vertical reciprocation of the spindle 174 thereat.

It will be understood that when the operator inserts a lamp 70 into a bulb holder head 40 at either station "1" or "2" that the common lead wire 90 is pulled toward the operator away from the tubulation 76 and bent over the seal of the lamp 70. In turn the major filament lead wire 82 (which is to be threaded through eyelet 84 of the base 78) and the minor filament lead wire 86 (which is to be threaded through the hole of the base ring 88 of a base 78) are pulled upwardly in a vertical plane parallel to the vertical axis lamp 70.

When the gear teeth on the gear 178 engage the gear segment 324, the bulb holder shaft 174 and the lamp 70, held therein, are rotated exactly 180° so that the common lead wire 90 faces inwardly toward the center of the base threading machine 10. Since the bulb holder fingers 196 do not rotate with the lamp 70, the fingers 196 are momentarily opened by engagement of the operating lever 200 with a stationary cam 203 (Figs. 24 and 25) to permit the facile rotation of the bulb 70 by the bulb holder rotating mechanism 179. The cam 203 is mounted on the lamp transfer mechanism 104, as hereinafter explained.

After the rotation of the bulb 70 by the rotating mechanism 179, the left hand shoe 320 of the gear 178 (when viewed in Fig. 21) is now engaged with the toothless portion of the ring 322. This engagement between the toothless portion of the ring 322 and the shoe 320 of the gear 178 is continuous (Fig. 22), so that the transfer mechanism 104 delivers the lamp 70 from a head 40 of the machine 10 to a basing machine head 106 (Fig. 2) of the basing machine 108, with the common lead-in wire 90 facing outwardly from the center of the basing machine 108. This positioning of the common lead wire 90 permits the soldering of the lead wire 90 to a shell 92 of a base 78 on the basing machine 108.

Base positioning mechanism

The base positioning mechanism 100 (Figs. 2 through 10) has an upstanding mounting bracket 230 (Figs. 3, 4 and 5) secured, as by bolts, to the outer periphery of the table 26 of the base threading machine 10. This bracket 230 carries a yoke 232 (Figs. 4, 5 and 6) which is provided with a base positioning mechanism shaft guide hole 234 on the left hand end thereof, when viewed in Fig. 4.

As shown particularly in Fig. 4, this shaft guide hole 234 is rectangular in horizontal cross section and receives, in reciprocable engagement therein, a reciprocable but not rotatable, base positioning mechanism shaft 236 provided with a rectangular horizontal cross section on its upper portions. The shaft 236 has (Fig. 7) a generally circular cross section on its lower portions below the guide hole 234 to permit rotation of a base holder head 250 thereon, as hereinafter explained.

The left end of the lever 238 (when viewed in Fig. 4), carried on an upper bifurcated projection of the yoke 232, is flexibly connected to the upper portions of the shaft 236. A connecting rod 240 (Figs. 3 and 4) extends from the other end of the lever 238 through the table 26 (Fig. 3), wherein it reciprocates. The rod 240 is connected at its lower end to a generally horizontal lever 241 (Figs. 2 and 3). This lever 241 is rotatable on a horizontal shaft 242 suitably journaled on a pair of brackets 243 depending from the under side of the table 26 of the base threading machine 10. The other end of the lever 241 carries a cam roller for engagement with the base positioning mechanism operating cam 128 on the main cam shaft 124.

The base positioning mechanism shaft 236 extends substantially below the guide hole 234 in the yoke 232, and (Figs. 4, 5 and 7) where its horizontal rectangular cross section changes to a generally circular cross section, carries a base positioning mechanism rotating 245 of a base holder head rotating mechanism 246. The gear 245 is continuously rotatable on a suitable bushing on the reciprocable shaft 236. A suitable shoulder is provided on the shaft 236 below the gear 245 to support the gear 245. A pair of spring tensioned pins 247 extend through the gear 245 (Fig. 5) and thread into an annular friction drive ring 248. This ring 248 engages and resiliently frictionally drives a hollow base holder head casting or body 249 of the base holder head 250 (Figs. 4, 5 and 10). The reciprocable, but not rotatable, shaft 236 carries a base locating pin mounting plate 252 (Figs. 5 and 9) on its lower end. Between the shoulder on the shaft 236 and the plate 252, a dog trip plate 254 (Fig. 5) is secured to the shaft 236, as by bolts, for use as hereinafter explained. The locating pin mounting plate 252 carries a vertically axial base eyelet hole locating pin 256 and a resiliently mounted spring tensioned base ring hole locating pin 258 (Fig. 5) mounted on the outer periphery of the ring 252.

Base holder head

The body 249 of the base holder head 250 is rotatable on suitable bushings in a generally hollow mounting plate 260 secured on the upper portions of the mount rods 190 (Figs. 3, 5, 7, 8 and 9). This body 249 is a generally hollow semi-cylinder provided with a base delivery plunger mechanism guide hole 261, for use as hereinafter explained. In addition, the body 249 has an upper shoulder or flange 262 (Fig. 4) which rides in an annular groove 264 cut in the top face of the mounting plate 260 (Figs. 5 and 9). As shown in Fig. 9, the groove 264 is provided with a dog locking segment 266 (Fig. 5), of greater depth then the remainder of the annular groove 264. A dog 268 (Figs. 5 and 9) is pivotable on a suitable pin (Fig. 9) mounted across a dog slot 272 provided in the body 249. A compression spring (Fig. 5), in a suitable hole in the body 249 (Fig. 5), compresses the upper arm of the dog 268 to normally project above the body 249. In this way the lower arm of the dog 268 normally remains in engagement with the locking segment 266 of the annular groove 264 (Fig. 9) in the plate 260.

It will be understood that as the reciprocable shaft 236 descends, the dog trip plate 254 pushes down the upper arm of the dog 268 to permit rotation of the base holder head body 249 along with the friction drive ring 248 and the gear 245.

As shown particularly in Fig. 10 a generally semi-circular base holder mounting and retaining plate 280 of generally larger radius than the lower portions of the body 249 is secured to the body 249, as by a bolt 282. The plate 280 is provided with hub portions 284 (Fig. 10) from which depend a pair of base holder arm pins 286. Each of these pins 286 carry a base holder finger 288, spring torsioned by means of a spring (Figs. 5 and 10). The bottom portion of the body 249, which depends below the flange or mounting plate 280, (Figs. 5 and 10) is suitably machined to provide a base receiving portion or nest 292.

It will be understood that by use of torsion springs an operator may load an inverted base 78 into the nest 292 manually by pressing the base 78 against the base holder fingers 288 to spread the fingers and permit the insertion of the base 78 into the nest 292 of the base holder body 249.

Base holder head rotating mechanism

In addition to the gear 245 on the shaft 236 the base holder head rotating mechanism 246 (Figs. 3, 4, 5 and 7) has a gear 300 in engagement with the gear 245. It will be understood that the height of the gear 300 (Figs. 3, 4 and 5) is substantially greater than the height of the gear 245 to permit the continued engagement with the gear 245, during the reciprocation of the shaft 236, at station 5 the lamp transfer station.

The gear 300 is mounted on a vertical shaft 302 suitably journaled in an upper bearing 304 (Figs. 3 and 4) projecting from the mounting bracket 230 of the base positioning mechanism 100 and a lower bearing 306 secured in the table 26 of the base threading machine 10. The shaft 302 carries a gear 308 below the table 26 (Figs. 2 and 3) in engagement with a driver gear 310. The gear 310 (Fig. 3) is rotatable on a vertical shaft depending from the table 26 and is driven by a sprocket 312 carried on its lower end in engagement with the sprocket chain 160 of the right angle drive 162.

Operation

As a lamp holder head 40 and a base holder head 250 are indexed to station "3," the base loading and base positioning station of the base threading machine 10, the operator inserts a base 78 through the spring torsioned fingers 288 into the base nest 292 of the base holder head body 249. It will be understood that at this point the shaft 236 and the driven gear are in the "up" position or dotted position, shown in Fig. 4. At a predetermined time the shaft 236 is reciprocated downwardly through the guide hole 234 in the yoke 232 by the base positioning mechanism operating cam 128 and the above described connecting linkage comprising the lever 242, the connecting rod 240 and the lever 238 (Figs. 3, 4 and 5). Near the end of the downward travel of the shaft 236 the dog tripping plate 254 on the shaft 236 has depressed the upper arm of the dog 268 (Figs. 5 and 9) thus raising the lower arm of the dog 268 from the locking segment 266 in the annular groove 264.

The friction drive ring 248 continuously rotated by the gear 245 is forced downwardly into frictional engagement with the top face of the base holder body 249, thus causing said body and the base 78 held by the fingers 288 in the nest 292 therein to rotate therewith. The lower arm of the dog 268 then rotates in the annular groove 264 provided in the top face of the mounting plate 260 on the mount rod 190.

It will be further understood that at the end of the downward travel of the shaft 236 to the "down" position shown in Fig. 4, the center base locating pin 256 has been inserted into the eyelet 84 of the base 78. The stationary spring tensioned ring hole centering pin 258 is riding around the ring 88 of the rotating base 78 until it encounters the hole therein, and drops thereinto, as shown in Fig. 5. At this point the base 78 is held securely by the pins 256 and 258 and no longer rotates with the base holder head body 249 and flange mounting plate 280.

Shortly thereafter, the shaft 236 is reciprocated upwardly by the cam 138 and the above described connecting linkage from the "down" position shown in Fig. 4 to its "up" or dotted position shown in Fig. 4. The dog tripping plate 254 releases the spring tensioned dog 268 thus permitting the lower arm thereof to once more engage the locking segment 266 of the annular groove 264 in the top face of the mounting plate 260. It will be understood that meanwhile the gear 245, the friction drive ring 248 and the locating pins 256 and 258 have also been raised to their "up" or dotted position shown in Fig. 4, thus eliminating further rotation of the body 249. The bulb holder head 40 and the base holder head 250 with the properly aligned base 78 therein are soon thereafter indexed by the indexing mechanism of the base threading machine 10 from station "3," the base feeding and positioning station, to station "4," the lead wire threading station.

Lead wire threading mechanism

The lead wire threading mechanism 102 at station "4" of the lead wire threading machine 10 (Figs. 2, 3, 11 through 20 and 31) comprises essentially a lead wire stretching and positioning jaw mechanism 330, a lead wire receiving needle mechanism 332 and a base delivery plunger mechanism 334 which, as hereinafter explained, are mounted on a mounting bracket 336 upstanding from the table 26 of the machine 10.

General operation of lead wire threading mechanism

It will be understood that at the start of the operating cycle at station "4" the lead wire stretching and positioning jaw mechanism 330 (Fig. 11) closes about the upper end portions of the major filament lead wire 82 and the minor filament lead wire 86 to position the end portions thereof, to be received within hollow needles 338 and 340 of the lead wire receiving needle mechanism 332. Simultaneously with the closing of the lead wire stretching and positioning jaw mechanism 330, the lead wire receiving needle mechanism 332 starts to reciprocate downwardly with respect to the base delivery plunger mechanism 334, for example approximately 2⅛". The needles 338 and 340 pass through the hole in the base ring 86 and the eyelet 84 of a base 78 held in the base holder head 250. Then the base delivery plunger mechanism 334 begins to travel downwardly with the lead wire receiving needle mechanism 332 for another approximately 1½" of travel.

During this travel the lead wire receiving needle mechanism 332 completes its stroke (Fig. 13) and receives the lead wires 82 and 86 previously aligned by the lead wire stretching and positioning mechanism 330. The base delivery plunger mechanism 334 has picked up a positioned base 78 and moved the base 78 downwardly through the base holder head 250 toward the lamp 70 in the bulb holder head 40. The lead wire stretching and positioning mechanism 330 now swings open to permit the base delivery plunger mechanism 334 (Fig. 15) to continue downwardly with respect to the needles 338 and 340 of lead wire receiving needle mechanism 332 and the leads 82 and 86 within the needles 338 and 340 for approximately another ⅝" to position the base 78 with respect to a lamp 70.

Meanwhile the upper ends of the major filament lead wire 82 and minor filament lead wire 86, secured within the needles 338 and 340, have been threaded through respectively the eyelet 84 of the base 78 and the hole in the base ring 88 of the base 78.

Lead wire stretching and positioning jaw mechanism

As shown in Figs. 2 and 3, a horizontal lever shaft 210 is suitably journaled in a pair of brackets 212 depending from the table 26 of the machine 10, adjacent the lead wire stretching and positioning jaw cam 130, the lead wire receiving needle cam 132 and the base delivery plunger cam 134. A lead wire stretching and positioning jaw lever 346 is rotatable on the shaft 210 and carries a cam roller on one end, held in engagement with the lead wire stretching and positioning jaw cam 130. The other end of the lever 346 is flexibly connected to a vertical connecting rod 348 (Figs. 2, 3 and 13).

A generally horizontal connecting lever 350 (Figs. 11, 12, 13, 14, 15 and 31) is rotatable on a shaft 352 journaled in a suitable bracket 354 fixed to the inner portions of the mounting bracket 336. The lever 350 (Fig. 31) is joined at its outer end to the upper portion of the connecting rod 348 and carries a vertical link 356 on its inner end (Figs. 11, 12, 13, 15 and 17). As shown in Figs. 12, 14 and 31, the shaft 352 extends through the bracket 354 and carries thereon a short lever 358 which is similar to the right hand portion of the lever 350, when viewed in Fig. 14. The inner end of the lever 358 (Figs. 12 and 14) carries a link 360, similar to the link 356 carried by the lever 350.

The generally vertical depending links 356 and 360 each carry respectively on opposite sides of the bracket 354 (Fig. 11 particularly) a generally horizontal lever 362 and 364 respectively. The free ends of the levers 362 and 364 (Fig. 11) are fixed respectively to horizontal shafts 366 and 368 (Fig. 17) journaled in suitable brackets 369 and 370 (Figs. 15 and 17) affixed to the outer side walls of an inner housing slide 372 (Figs. 11 and 13). This housing slide 372 is slidable within the bracket 354, on guides 373 (Fig. 14) secured to the bracket 354 as by bolts. The slide 372 depends substantially below (Figs. 11 and 12) the bracket 354.

These shafts 366 and 368 (Figs. 15 and 17) each carry respectively a pair of generally vertically depending lead wire positioning and stretching jaw mounting levers 374 and 376 and 378 and 380 (Fig. 31). The lower portions of the levers 374 and 376, 378 and 380 are connected by horizontal pins 382 (Figs. 13, 15 and 18) for adjustably mounting therebetween, by means of suitable vertical slots in the levers 374, 376, 378 and 380 and lead wire stretching and positioning jaw blocks 390 and 392 (Figs. 11, 13, 15 and 18 through 20).

Lead wire stretching and positioning jaws

These jaws mounting blocks 390 and 392 carry removable and adjustable jaws 394 and 395 on their recessed jaw mounting portions (Figs. 11, 13 and 15) and lead wire stretching fingers 396 and 397 on their bottom faces respectively, Figs. 11, 13 and 18 through 20. Each of the jaws 394 and 395 has a lead wire guide or centering plate 398 mounted on either the block 390 or the block 392. Each plate 398 is provided with a hollow conical upper lead wire guide portion. An upper needle guide plate 399 rests on the lead wire centering plate 398 and is provided with an inverted conical needle entrance portion. A suitable pin integrates the lead wire centering plate 398 and the needle guide plate 399 with the jaw receiving portion of either the block 390 and block 392.

It will be understood that when the jaws 394 and 395 close, the lead wire guide fingers 396 and 397 grasp the lead wires 82 and 86 (Fig. 13). Simultaneously the lead wire centering plates 398 center the wires 82 and 86. At this point in the lead wire stretching and positioning operation the lead wires 82 and 86 extend beyond the needle guide plates 399 (Fig. 11).

The lead wire stretching and positioning cam 130, through the above described linkage, moves the jaws 394 and 395 upwardly to the dotted position shown in Fig. 11. In this position the ends of the lead wires 82 and 86 are aligned axially within the upper portion of the lead wire centering plates 398. In this position the lead wires 82 and 86 are positioned to be received within the needles 338 and 340 as said needles descend through the needle guide plate 399, thereabove, as hereinafter described.

Base delivery plunger mechanism

As shown in Figs. 2 and 3 the horizontal lever shaft 210 also carries a base delivery plunger cam lever 400 thereon, adjacent to the base delivery plunger cam 134. A cam roller on one end of the lever 400 is held in engagement with the base delivery plunger cam 134. The other end of the lever 400 is joined to a generally vertical connecting rod 402 (Figs. 2, 3 and 13). A generally horizontal lever 404 is connected to the other end of the rod 402 and is secured to a horizontal shaft 406 journaled in suitable bearings upstanding from the base threading mechanism mounting bracket 336.

As shown in Figs. 11 and 12 this shaft 406 carries a short lever 408, similar to the operating end of the lever 404. The levers 404 and 408 are connected by means of links 410 and 412 respectively to a receiving needle mechanism slide or guide housing 414 (Figs. 11, 12, 13, 14, 16 and 17). This housing 414 reciprocates in the housing slide 372 by means of projections or keys 416 (Fig. 14) which are slidable in suitable key-ways provided in the inner side wall of the casting or housing slide 372.

The bottom portion of the housing 414 (Figs. 12, 13, 14 and 17) carries lead wire receiving needle mechanism slide guide 417, for use as hereinafter explained. A base delivery plunger 420 is carried on the lower ends of the guides 417 (Figs. 11, 12, 13). The plunger 420 is suitably provided with needle holes for projection of the needles 338 and 340 therethrough (Fig. 12). The plunger 420 is also provided with a base receiving nest 426, contoured to fit the upper end of a base 78 (Fig. 11). Suitable holes are provided in the nest 426 for connection with a pair of flexible vacuum lines 428 and 430 (Figs. 11, 12, 14 and 15) which extend up along the guides 417, through the housing 414 and thence as shown in Fig. 12 to a suitable vacuum system (not shown).

It will be understood that after the plunger 420 has received the base 78 within the nest 426, said base 78 is retained therein during its downward descent (with the plunger 418 and head 420) by means of the vacuum created through the lines 428 and 430.

It will be further understood that during the downward travel of the plunger 420, the plunger 420 is partially guided by means of the base delivery mechanism guide hole 261 in the body 249 of a base holder head 250.

Lead wire receiving needle mechanism

A lead wire receiving needle mechanism cam lever 431 on the lever shaft 210 (Figs. 2 and 3), similar to the levers 346 and 400, has a roller on one end in continuous engagement with the lead wire receiving needle cam 132. A connecting rod 432 (Fig. 13) joins the other end of the lever 431 with a horizontal lever 434 which is pivotable on the shaft 406. A link 436 (Figs. 11, 13 and 15) joins the inner end of the lever 434 with a vertical needle plunger or slide rod 438 of circular cross section (Figs. 12 and 17).

As hereinbefore mentioned this slide rod 438 reciprocates in the guides 417 carried by the guide housing 414 of the base delivery plunger mechanism 334. As shown particularly in Figs. 12 and 17 the slide rod 438 (Figs. 11, 12, 13 and 15) carries a needle mounting block 440 on its lower end. The needles 338 and 340 project downwardly from the block 440 and obviously are capable of passing through the needle holes in the base delivery plunger 420, the hole in the base ring 88 and the eyelet 84 of a base 78 respectively, and over the aligned ends of the major filament lead wire 82, and the minor filament lead wire 86.

Specific operation of the lead wire threading mechanism

Shortly after a bulb holder head 40 (carrying a lamp 70) and a base holder head 250 (carrying a positioned base 78) have indexed into station "4," the lead wire stretching and positioning jaw cam moves the roller carrying end of cam lever 342 downwardly, the connecting rod 348 upwardly and the operating end of the levers 350 and 358 and the slide 372 (Figs. 11, 13 and 15) downwardly. Through the links 356 and 360 (Fig. 31) and the levers 362, 364 and levers 374 and 376 and the levers 378 and 380 (carrying respectively the jaw blocks 390 and 392 and the jaws 394 and 395) are moved toward each other. The jaws 394 and 395 grasp the ends of the lead wires 82 and 86 therebetween and move up to stretch and align said lead wires for insertion later into the needles 338 and 340 respectively.

Simultaneous with the actuation of the lead wire stretching and positioning mechanism 330, the lead wire receiving needle cam 132 moves the roller carrying end of the cam lever 431 downwardly, thus moving the connecting rod 432 upwardly and the operating end of the horizontal lever 434 downwardly (Fig. 13). Through the lever 436, the slide rod 438 is reciprocated downwardly, for example approximately 2⅛", carrying the needle block 440 and the needles 338 and 340 therewith. At the completion of this downward travel the needles 338 and 340 are projecting, respectively, through the hole in the ring 88 and the eyelet 84 of a base 78 held in a base holder head 250 (Fig. 13).

Immediately thereafter the base delivery plunger mechanism cam 134 moves the roller carrying end of the cam lever 400 downwardly. This motion moves the connecting rod 402 upwardly and the operating end of the lever 404 in a downward direction. As a result, the slide housing 414, the plunger 418 and the base delivery head 420 of the base delivery plunger mechanism 334 move downwardly together with the lead wire receiving needle mechanism 332, for example approximately 1½". During this travel the lead wire receiving needles 338 and 340 engage the aligned ends of the lead wires 82 and 86. The base delivery plunger 420 engages a base 78 in the nest 426 and holds said base 78 therein by means of the vacuum in the lines 428 and 430. The plunger 420 moves the base 78 from the base holder head 250 downwardly toward the lamp 70 held in the bulb holder 40 thereabeneath.

It will be understood that at the end of this travel the lead wire receiving needle mechanism 332 ceases to move downwardly, and that the lead wire stretching and positioning jaw mechanism 330 is opened by means of a reversal of the above described motion of the lead wire stretching and positioning jaw mechanism 330.

The base delivery plunger mechanism 334 continues downwardly, for example about ⅝" (Fig. 15) further, through the now opened jaws 394 and 395 to position the base 78 about the sealed portion of the lamp 70.

The vacuum in the lines 428 and 430 of the base delivery plunger mechanism 332 is then shut off by means (not shown) such as cam action, and both the lead wire receiving needle mechanism 332 and the base delivery plunger mechanism 334 are reciprocated upwardly by their respective cams 132 and 134 and the above described connecting linkages to their normally "up" position shown in Fig. 11.

The now threaded base 78 and lamp 70 are indexed from station "4," the lead wire threading station, to station "5," the lamp transfer station, where the base 78 threaded with the lead wires 82 and 86, and the lamp 70 are transferred by the transfer mechanism 104 from the head 40 of the lead wire threading machine 10, to a head 106 of the basing machine 108.

*Transfer mechanism*

The lamp transfer mechanism 104 (Figs. 2 and 3 particularly) has a vertical shaft 500 journaled in a suitable bracket 502 (Fig. 3) which depends from the under side of the table 26 of the lead wire threading machine 10. This shaft carries a bell crank lever 504 having a follower arm (Fig. 2) which is provided with a roller for engagement with the transfer mechanism barrel cam 136. The opposite arm of the bell crank lever 504 carries a segmental gear in engagement with a gear 508 on a vertical shaft 510. The shaft 510 is likewise journaled in suitable brackets below the table 26 and adjacent to the shaft 500.

Above the gear 508 this shaft 510 is provided with a second gear 512, of larger diameter than the gear 508, which meshes with a gear 514 (Fig. 3) fixed to a vertical pinion shaft 516 extending through the hollow support shaft 22 of the turret 20 and a transfer mechanism mounting bracket 517 fixed to the top of the support shaft 22. As shown particularly in Fig. 3, the shaft 516 carries a pinion drive gear 518 on its upper end (Fig. 23).

As shown in Figs. 23 through 28, the transfer mechanism mounting bracket 517 has a guide housing portion 520 of generally U-shaped vertical cross section. A slide 522 (Figs. 26 through 28) provided with a longitudinal clearance slot for the shaft 516 is slidable within the guide housing 520. The slide 522 (Fig. 27) carries a gear rack 524 which is in engagement with the drive gear 518 on the shaft 516.

In addition to the rack 524, the slide 522 also carries the reciprocating bulb holder jaw opening cam 202 (Figs. 3, 23, 24, 25 and 26). This cam 202 is essentially a longitudinal horizontal plate provided with a horizontally inclined right hand end portion (when viewed in Fig. 24) along which the roller on the end of the operating lever 200 of a bulb holder head 40 may ride.

As shown particularly in Fig. 28 the left hand end of the guide housing 520 (when viewed in Fig. 24) carries a cam mounting bracket 528 upon which the hereinbefore mentioned stationary bulb holder jaw opening cam 203 is mounted. It will be recalled that the cam 203 opens the bulb holder paws 196 of a bulb holder head 40 during the hereinbefore mentioned rotation of a lamp 70 by the bulb holder rotating mechanism 179 between stations "2" and "3."

In Figs. 23, 24 and 25 the right hand end portion of the slide 522 carries a bulb transfer head 530, shown particularly in detail in Fig. 29. A body 532 of each head 530 is secured thereon by means of a pin 534 which serves as a horizontal pivot of a universal joint, thus permitting rotation of the head 530 in a horizontal plane.

The body 532 has a generally hollow vacuum line portion and is connected to a vacuum transfer cup 536 by means of a ball and socket joint of the above mentioned universal joint. The ball and socket joint permits vertical movement of the cup 536 with respect to the body 532. The cup 536 carries a rubber ring 538 which serves as a seal between the cup 536 and envelope 72 of a lamp 70. A pair of split semi-cylindrical spring retaining sleeves or spring holders 540 are contained within the hollow portion of the body 532. A pin 542 extends through clearance holes in the body 532 and the ball and socket joint and the split sleeves 540. A spring extending from a stop 543 to a suitable shoulder provided in both of the sleeves 540 exerts pressure on the pin 542 and permits slight longitudinal adjustment to allow for variations in the diameter of the lamp envelopes 72. A vacuum line 546 extends from a suitable vacuum supply (not shown) to the hollow portion of the transfer head body 532.

*Operation*

It will be understood that when a lamp 70 held in a bulb holder head 40 is indexed into station "5" the transfer station, the envelope 72 rides against the rubber ring 538. During the contact between the envelope 72 and the ring 538 it will be understood that the pivotable movement of the body 532 in a horizontal plane about the pin 534 permits horizontal adjustments between the transfer cup 536 and the envelope to seat the envelope 72 in the ring 538. The ball and socket joint between the transfer cup 536 and the transfer head body 532 similarly provides for vertical angular adjustments therebetween. The clearance slots in the body 534 through which the pin 542 extends (due to the action of the spring within the sleeves 540) provides some longitudinal axial adjustment between the envelope 72 and the ring 538.

In addition, when a lamp 70 and a head 40 index into station "5" the roller on the operating lever 200 of a head 40 comes to rest against the inclined portion of the cam 202 on the slide 522.

It will be understood that after the envelope 72 has engaged the ring 538 of the transfer cup 536 that the vacuum on the line 546 (Figs. 24 and 29) is actuated by means (not shown), such as cam action to securely hold the lamp 70 therein. Shortly thereafter the head pull-down mechanism 110 lowers the bulb holder nests 172 on the bulb holder head 40 of the machine 10 and the bulb holder head 106 of the machine 108, thus leaving the lamp 70 held by the bulb holder jaws 196 and 198 and the transfer cup 536.

As shown in Figs. 2 and 3 the transfer mechanism cam 136 at a predetermined time will move the follower lever 504, the shaft 500 and the gear segment lever 506 in a counterclockwise direction. The gears 508 and 512 on the shaft 510 (Fig. 3) are rotated in a clockwise direction. Hence, the gears 514 and 518 on the shaft 516 rotate in a counterclockwise direction. As a result the gear rack 524 carried by the slide 522 and the transfer head 530 will be moved to the right (when viewed in Figs. 24 and 25). This movement causes the roller on the operating lever 200 of a head 40 to ride along the cam 202, open the jaws 196 and to permit the transfer of the lamp 70 to a position above a head 106 of the basing machine 108.

The pull-down mechanism 110 releases the head 106 to seat the transferred lamp 70 in a nest 172 of the head 106. The vacuum within the transfer head 530 is cut off, releasing the lamp 70. The transfer mechanism barrel cam 136 returns the transfer mechanism 104 to its starting position through a reversal of the above described linkage. The pull-down mechanism 110 may either release the head 40, or the head 40 may be returned to its "up" position by the action of the pull down arm 180 on the spindle 174 riding off the yoke 218 of the head pull-down mechanism 110 during the next index.

Although a preferred embodiment of the invention has been disclosed, it will be understood that modifications may be made within the spirit and scope of the invention.

I claim:

1. In combination for a machine for threading the lead wires of a sealed lamp through predetermined holes in a base, a base holder head comprising a base holder mounting plate, a body rotatable in said plate and adapted to receive said base therein and means on said body for securing said base therein, and a base positioning mechanism comprising a mounting bracket and a yoke, a shaft reciprocable in said yoke, a friction drive ring rotatable on said shaft and engageable with said body to cause rotation of the latter, reciprocating means connected to said shaft and for moving said friction drive ring into and out of engagement with said body, means connected to said friction drive ring and for rotating the latter and locating pins carried by said shaft and engageable with said base, said locating pins being adapted to insert themselves into the predetermined holes in said base when said body and said base are being rotated by said friction drive ring to orient said base in a predetermined position.

2. In combination for a machine for threading the lead wires of a sealed lamp through predetermined holes in a base, a base holder head comprising mounting means and a body rotatable in said mounting means and adapted to secure said base therein, and a base positioning mechanism comprising support means, a mounting member reciprocable in said support means, a drive member rotatable on said mounting member and engageable with said body to cause rotation of the latter, reciprocating means connected to said mounting member and for moving said drive member into and out of engagement with said body, means connected to said drive member and for rotating the latter and locating members carried by said mounting member and engageable with said base, said locating members being adapted to insert themselves into the predetermined holes in said base when said body and said base are being rotated by said drive member to orient said base in a predetermined position.

3. In combination for a machine for threading the lead wires of a sealed lamp through predetermined holes in a base, a base holder head comprising mounting means, a body rotatable in said mounting means and adapted to receive said base therein, means on said body for securing said base therein and locking means carried by said body and normally engageable with said mounting means to prevent rotation of said body with respect thereto, and a base positioning mechanism comprising support means, a mounting member reciprocable in said support means, a drive member rotatable on said mounting member and engageable with said body to cause rotation of the latter, reciprocating means connected to said mounting member and for moving said drive member into and out of engagement with said body, means connected to said drive member and for rotating the latter, locating members carried by said mounting member and engageable with said base, said locating members being adapted to insert themselves into the predetermined holes in said base when said body and said base are being rotated by said drive member to orient said base in a predetermined position, and tripping means carried by said mounting member and operable during movement of said drive member toward said body to release said locking means thereby permitting rotation of said body by said drive member with respect to said mounting means.

4. In combination for a machine for threading the lead wires of a sealed lamp through predetermined holes in a base, a base holder head comprising mounting means, a body rotatable in said mounting means and adapted to receive said base therein, means on said body for securing said base therein and a dog pivoted on said body and normally engageable with said mounting means to prevent rotation of said body with respect thereto, and a base positioning mechanism comprising support means, a shaft reciprocable in said support means, a friction drive ring rotatable on said shaft and engageable with said body to cause rotation of the latter, reciprocating means connected to said shaft and for moving said friction drive ring into and out of engagement with said body, means connected to said friction drive ring and for rotating the latter, locating pins carried by said shaft and engageable with said base, said locating pins being adapted to insert themselves into the predetermined holes in said base when said body and said base are being rotated by said friction drive ring to orient said base in a predetermined position, and a trip plate carried by said shaft and operable during movement of said friction drive ring toward said body to release said dog thereby permitting rotation of said body by said friction drive ring with respect to said mounting means.

References Cited in the file of this patent

UNITED STATES PATENTS

| | | |
|---|---|---|
| 1,817,746 | Gooskens et al. | Aug. 4, 1931 |
| 2,359,432 | McNamara | Oct. 3, 1944 |
| 2,392,799 | Scholes et al. | Jan. 8, 1946 |
| 2,536,677 | Brunner et al. | Jan. 2, 1951 |
| 2,683,521 | Reynolds | July 13, 1954 |
| 2,698,987 | McGowan | Jan. 11, 1955 |
| 2,748,450 | Flaws et al. | June 5, 1956 |